United States Patent
Dodd-Noble et al.

(10) Patent No.: US 12,317,347 B2
(45) Date of Patent: May 27, 2025

(54) OPTIMIZED SERVING GATEWAY NODE SELECTION FOR INTERWORKING NETWORKS

(71) Applicant: Cisco Technology, Inc., San Jose, CA (US)

(72) Inventors: Aeneas Sean Dodd-Noble, Andover, MA (US); Om Prakash Suthar, Bolingbrook, IL (US); Raghavendra Suryanarayanarao Vidyashankar, Bangalore South (IN); Vivek Agarwal, Chelmsford, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 662 days.

(21) Appl. No.: 16/859,266

(22) Filed: Apr. 27, 2020

(65) Prior Publication Data

US 2021/0337611 A1 Oct. 28, 2021

(51) Int. Cl.
| | |
|---|---|
| *H04W 76/15* | (2018.01) |
| *H04W 8/08* | (2009.01) |
| *H04W 76/11* | (2018.01) |
| *H04W 80/10* | (2009.01) |
| *H04W 88/16* | (2009.01) |

(52) U.S. Cl.
CPC ............ *H04W 76/15* (2018.02); *H04W 8/08* (2013.01); *H04W 76/11* (2018.02); *H04W 80/10* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 10,341,947 B2 | 7/2019 | Mathai et al. | |
| 2015/0103665 A1* | 4/2015 | Kaippallimalil | H04W 76/12 370/235 |

(Continued)

FOREIGN PATENT DOCUMENTS

WO 2018006985 A1 1/2018

OTHER PUBLICATIONS

3GPP, "3rd Generation Partnership Project; Technical Specification Group Core Network and Terminals; Evolved Packet System (EPS); 3GPP EPS AAA interfaces (Release 16)", 3GPP TS 29.273 V16.0.0, Mar. 2020, 200 pages.

(Continued)

*Primary Examiner* — Gregory B Sefcheck
*Assistant Examiner* — Suk Jin Kang
(74) *Attorney, Agent, or Firm* — Edell, Shapiro & Finnan, LLC

(57) ABSTRACT

In one example, a first connectivity request for a first network connection between a user equipment and a first network is obtained. A control plane serving gateway node for the first network connection is selected. The control plane serving gateway node is co-located with a control plane packet data network gateway node configured to support a second network connection between the user equipment and a second network that is different from the first network. A second connectivity request for the second network connection is obtained. The second network connection is established with the control plane serving gateway node and the control plane packet data network gateway node.

20 Claims, 7 Drawing Sheets

(56) References Cited

U.S. PATENT DOCUMENTS

| | | | | |
|---|---|---|---|---|
| 2015/0201372 | A1* | 7/2015 | Chu | H04W 4/80 370/254 |
| 2015/0236898 | A1* | 8/2015 | Bonnier | H04W 76/22 370/218 |
| 2016/0353325 | A1* | 12/2016 | Poikonen | H04W 28/088 |
| 2017/0163727 | A1* | 6/2017 | Dolby | H04W 76/12 |
| 2018/0220479 | A1* | 8/2018 | Shu | H04W 76/10 |
| 2018/0302857 | A1* | 10/2018 | Shan | H04W 76/22 |
| 2019/0007984 | A1* | 1/2019 | Kuroda | H04W 88/16 |
| 2019/0028943 | A1 | 1/2019 | Wang et al. | |
| 2019/0261233 | A1* | 8/2019 | Duan | H04W 36/14 |
| 2019/0289652 | A1* | 9/2019 | Shu | H04W 76/10 |
| 2020/0008054 | A1 | 1/2020 | Wifvesson et al. | |
| 2020/0028896 | A1* | 1/2020 | Veldanda | H04W 76/12 |
| 2020/0107230 | A1* | 4/2020 | Zhao | H04W 76/11 |
| 2020/0137812 | A1* | 4/2020 | Shu | H04W 76/12 |
| 2020/0187301 | A1* | 6/2020 | Park | H04W 8/08 |
| 2020/0205212 | A1* | 6/2020 | Rahman | H04W 74/0816 |
| 2020/0245182 | A1* | 7/2020 | Chitta | H04W 28/0252 |
| 2020/0329420 | A1* | 10/2020 | Ishikawa | H04W 48/14 |
| 2021/0029760 | A1* | 1/2021 | Shu | H04W 36/00 |
| 2021/0051680 | A1* | 2/2021 | Ni | H04L 41/5051 |
| 2021/0058458 | A1* | 2/2021 | Dolby | H04W 76/10 |
| 2021/0084582 | A1* | 3/2021 | Li | H04W 48/18 |
| 2021/0153268 | A1* | 5/2021 | Lee | H04W 12/06 |
| 2021/0160759 | A1* | 5/2021 | Muthusamy | H04W 40/246 |
| 2021/0204334 | A1* | 7/2021 | Watanabe | H04W 76/10 |
| 2021/0227595 | A1* | 7/2021 | Kuroda | H04W 88/16 |
| 2021/0314747 | A1* | 10/2021 | Yang | H04M 15/765 |
| 2021/0315039 | A1* | 10/2021 | Shaw | H04L 41/0803 |
| 2021/0329531 | A1* | 10/2021 | Muthusamy | H04W 40/30 |
| 2022/0046755 | A1* | 2/2022 | Yang | H04W 80/10 |
| 2022/0053407 | A1* | 2/2022 | Zhou | H04L 45/54 |
| 2022/0060947 | A1* | 2/2022 | Iwai | H04M 15/41 |
| 2022/0104313 | A1* | 3/2022 | Park | H04W 60/005 |
| 2022/0141747 | A1* | 5/2022 | Tao | H04W 36/0022 455/436 |
| 2022/0210702 | A1* | 6/2022 | Chen | H04W 60/04 |
| 2022/0295580 | A1* | 9/2022 | Vega | H04W 76/12 |
| 2022/0377826 | A1* | 11/2022 | He | H04L 61/5061 |

OTHER PUBLICATIONS

3GPP, "3rd Generation Partnership Project; Technical Specification Group Services and System Aspects; System architecture for the 5G System (5GS); Stage 2 (Release 16)", 3GPP TS 23.501 V16.4.0, Mar. 2020, 430 pages.

3GPP, "3rd Generation Partnership Project; Technical Specification Group Services and System Aspects; Procedures for the 5G System (5GS); Stage 2 (Release 16)", 3GPP TS 23.502 V16.4.0, Mar. 2020, 582 pages.

3GPP, "3rd Generation Partnership Project; Technical Specification Group Core Network and Terminals; Domain Name System Procedures; Stage 3; (Release 16)", 3GPP TS 29.303 V16.2.0, Mar. 2020, 79 pages.

3GPP, "3rd Generation Partnership Project; Technical Specification Group Core Network and Terminals; Interface between the Control Plane and the User Plane Nodes; Stage 3 (Release 16)", 3GPP TS 29.244 V16.3.1, Apr. 2020, 297 pages.

3GPP, "3rd Generation Partnership Project; Technical Specification Group Services and System Aspects; Architecture enhancements for control and user plane separation of EPC nodes; Stage 2 (Release 16)", 3GPP TS 23.214 V16.0.0, Jun. 2019, 16 pages.

3GPP, "3rd Generation Partnership Project; Technical Specification Group Core Network and Terminals; Non-Access- Stratum (NAS) protocol for Evolved Packet System (EPS); Stage 3 (Release 16)", 3GPP TS 24.301 V16.4.0, Mar. 2020, 573 pages.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 V16.6.0, Mar. 2020, 436 pages.

Cisco, "Cisco Ultra 5G Packet Core Solution", White Paper, C11-741057-00, Aug. 2018, 20 pages.

Cisco, "SGSN Administration Guide, StarOS Release 20", https://www.cisco.com/c/en/us/td/docs/wireless/asr_5000/20/SGSN/b_20_SGSN_Admin/b_20_SGSN_Admin_chapter_0101011.html, Aug. 8, 2016, 8 pages.

Wikipedia, "System Architecture Evolution", https://en.wikipedia.org/wiki/System_Architecture_Evolution, Feb. 4, 2020, 9 pages.

Wikipedia, "PFCP", https://en.wikipedia.org/wiki/PFCP, Feb. 27, 2020, 3 pages.

3GPP, "3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 16)", 3GPP TS 29.272 V16.2.0, Mar. 2020, 182 pages.

* cited by examiner

OPTIMIZED SERVING GATEWAY NODE SELECTION FOR INTERWORKING NETWORKS

TECHNICAL FIELD

The present disclosure relates to telecommunications technology.

BACKGROUND

Interworking networks are networks that are connected directly or indirectly within a system. Interworking networks can include fourth generation (4G) only networks, fifth generation (5G) only networks, and 4G and 5G networks. Thus, interworking networks can include both 4G network components and 5G network components integrated into a single system.

DESCRIPTION OF EXAMPLE EMBODIMENTS

Overview

In one example embodiment, a first connectivity request for a first network connection between a user equipment and a first network is obtained. A control plane serving gateway node for the first network connection is selected. The control plane serving gateway node is co-located with a control plane packet data network gateway node configured to support a second network connection between the user equipment and a second network that is different from the first network. A second connectivity request for the second network connection is obtained. The second network connection is established with the control plane serving gateway node and the control plane packet data network gateway node.

Example Embodiments

Figure 1:
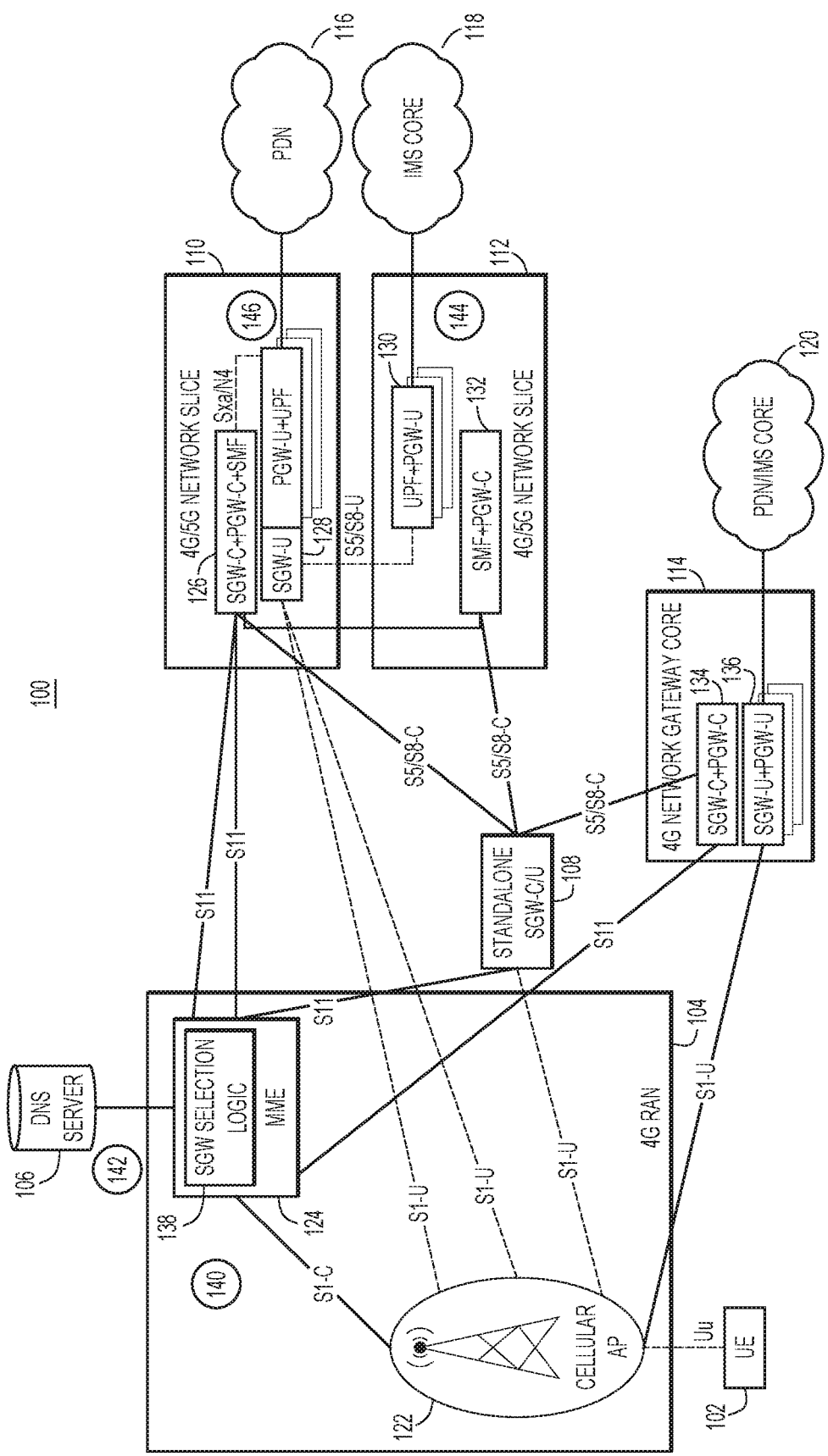
FIG. 1 illustrates a system configured to optimize Serving Gateway (SGW) selection for fourth generation (4G) and/or fifth generation (5G) interworking networks, according to an example embodiment.

FIG. 1 illustrates an example system 100 configured to optimize serving gateway node selection for fourth generation (4G) and/or fifth generation (5G) interworking networks. System 100 includes User Equipment (UE) 102, 4G Radio Access Network (RAN) 104, Domain Name System (DNS) server 106 and standalone Control plane and User plane Serving Gateway (SGW-C/U) 108. System 100 further includes 4G/5G network slice 110, 4G/5G network slice 112, 4G network gateway core 114, Packet Data Network (PDN) 116, Internet Protocol (IP) Multimedia Subsystem (IMS) core 118, and PDN/IMS core 120.

4G RAN 104 includes cellular Access Point (AP) 122 and Mobility Management Entity (MME) 124. 4G/5G network slice 110 may include co-located Control plane SGW (SGW-C), Control plane PDN Gateway (PGW-C), and Session Management Function (SMF) 126. 4G/5G network slice 110 may further include co-located User plane SGW (SGW-U), User plane PGW (PGW-U), and User Plane Function (UPF) 128. 4G/5G network slice 112 includes co-located UPF and PGW-U 130 and co-located SMF and PGW-C 132. 4G network gateway core 114 includes co-located SGW-C and PGW-C 134 and co-located SGW-U and PGW-U 136.

UE 102 is configured to communicate with cellular AP 122 over a Uu interface. Cellular AP 122 is configured to communicate with MME 124 over a Control plane S1 (S1-C) interface. Cellular AP 122 is configured to communicate with co-located SGW-U, PGW-U, and UPF 128 over multiple User plane S1 (S1-U) interfaces in the 4G Evolved Universal Mobile Telecommunications Service (UMTS) Terrestrial RAN (EUTRAN) access. For example, there may be one S1-U interface to facilitate a network connection with PDN 116 and another S1-U interface to facilitate a network connection with IMS core 118. Cellular AP 122 may also be configured to communicate with co-located SGW-U, PGW-U, and UPF 128 over multiple N3 interfaces in the 5G New Radio (NR) access. Cellular AP 122 is further configured to communicate with standalone SGW-C/U 108 over an S1-U interface, and with co-located SGW-U and PGW-U 136 over an S1-U interface to facilitate a network connection with PDN/IMS core 120.

MME 124 is configured to communicate with co-located SGW-C, PGW-C, and SMF 126 over multiple S11 interfaces (e.g., one S11 interface to facilitate a network connection with PDN 116 and another S11 interface to facilitate a network connection with IMS core 118). MME 124 is also configured to communicate with standalone SGW-C/U 108 over an S11 interface, and with co-located SGW-C and PGW-C 134 over an S11 interface to facilitate a network connection with PDN/IMS core 120. Standalone SGW-C/U 108 is configured to communicate with co-located SGW-C, PGW-C, and SMF 126, co-located SMF and PGW-C 132, and co-located SGW-C and PGW-C 134 over respective Control plane S5/S8 (S5/S8-C) interfaces. Co-located SGW-C, PGW-C, and SMF 126 is configured to communicate with co-located SGW-U, PGW-U, and UPF 128 over a concatenated Sxa/N4 interface. Co-located SGW-U, PGW-U, and UPF 128 is configured to communicate with co-located UPF and PGW-U 130 over a User plane S5/S8 (S5/S8-U) interface to facilitate a network connection with IMS core 118.

UE 102 may be associated with any suitable device configured to initiate a flow in system 100, and may be 4G-capable, 5G-capable, or both 4G- and 5G-capable. For example, UE 102 may include a computer, a vehicle and/or any other transportation-related device having electronic devices configured thereon, an automation device, an enterprise device, an appliance, an Internet of Things (IoT) device, a Personal Digital Assistant (PDA), a laptop or electronic notebook, a cellular telephone, a smartphone, a tablet, an Internet Protocol (IP) phone, and/or any other device and/or combination of devices, components, elements, and/or objects capable of initiating voice, audio, video, media, or data exchanges within system 100. UE 102 may also include any suitable interface to a human user such as a microphone, a display, a keyboard, or other terminal equipment. UE 102 may also be any device that seeks to initiate a communication on behalf of another entity or element such as a program, a database, or any other component, device, element, or object capable of initiating an exchange within system 100. UE 102 may be configured with appropriate hardware (e.g., processor(s), memory element(s), antennas and/or antenna arrays, baseband processors (modems), and/or the like), software, logic, and/or the like to facilitate respective over-the-air (air) interfaces for accessing/connecting to cellular AP 122. It will be appreciated that any number of UEs may be present in system 100.

Cellular AP 122 may terminate a cellular (e.g., 4G Long-Term Evolution (LTE)) air interface and may be configured with appropriate hardware (e.g., processor(s), memory element(s), antennas and/or antenna arrays, baseband processors (modems), and/or the like), software, logic, and/or the like to provide over-the-air coverage for cellular access. Cellular AP 122 may be implemented as an evolved Node B (eNB) to facilitate 4G LTE air access.

MME 124 is a 4G component configured to perform various Mobility Management (MM) operations including SGW selection for UE 102 during attach procedures. DNS server 106 may provide lookup services for system resources (e.g., hosts, services, functions, etc.) to provide resource records for various DNS queries. The resource records may include Naming Authority Pointer (NAPTR) resource records, and may define IP version 4 (IPv4) or IP version 6 (IPv6) host addresses. DNS server 106 may include resource records for any number of resources (e.g., SGWs and PGWs).

An SGW is a 4G component configured to route/forward network data packets to facilitate a network connection. A PGW is a 4G component configured to provide connectivity between a UE and an external network by serving as a point of exit to, or entry from, the external network. Control and User Plane Separation (CUPS) is a technology that enables separation of one or more SGWs and PGWs into the control and user planes to provide independent location and scaling of the control and user planes. Thus, for example, CUPS may effectuate separation of an SGW into an SGW-U and an SGW-C, and a PGW into a PGW-U and a PGW-C. System 100 implements SGW-U, SGW-C, PGW-U, and PGW-C functionality, for example, in standalone SGW-C/U 108, co-located SGW-C, PGW-C, and SMF 126, co-located SGW-U, PGW-U, and UPF 128, co-located UPF and PGW-U 130, co-located SMF and PGW-C 132, co-located SGW-C and PGW-C 134, and co-located SGW-U and PGW-U 136.

An SMF is a 5G component and may provide functionality that is analogous to functionality provided by an SGW-C and a PGW-C. Typically, Data Network Name (DNN) based SMF selection and slicing is used to establish Protocol Data Unit (PDUs) on different Network Functions (NFs). System 100 implements SMF functionality, for example, in co-located SGW-C, PGW-C, and SMF 126 and co-located SMF and PGW-C 132. A UPF is a 5G component and may provide functionality that is analogous to functionality provided by an SGW-U and a PGW-U. Typically, a UPF may serve as a PDU Session Anchor (PSA) connected directly to a RAN, while an SGW-U is located between the PGW-U and the RAN. System 100 implements UPF functionality, for example, in co-located SGW-U, PGW-U, and UPF 128 and co-located UPF and PGW-U 130.

Co-located SGW-C, PGW-C, and SMF 126 and co-located SGW-U, PGW-U, and UPF 128 include both 4G components (e.g., SGW-C, PGW-C, SGW-U, and PGW-U) and 5G components (e.g., SMF and UPF). As such, 4G/5G network slice 110 supports both 4G and 5G telecommunications. Similarly, co-located UPF and PGW-U 130 and co-located SMF and PGW-C 132 include both 4G components (e.g., PGW-U and PGW-C) and 5G components (e.g., SMF and UPF). Thus, 4G/5G network slice 112 also supports both 4G and 5G telecommunications. Co-located SGW-C and PGW-C 134 and co-located SGW-U and PGW-U 136 include only 4G components (e.g., SGW-C, PGW-C, SGW-U, and PGW-U). As such, 4G network gateway core 114 only supports 4G telecommunications.

Although embodiments described herein focus on 4G and 5G technology, it will be appreciated that any suitable telecommunications technology (e.g., 3G, 4G, 5G, etc.) may be utilized. For example, any suitable SGW-C node configured to perform similar operations as an SGW-C may be used; any suitable PGW-C node configured to perform similar operations as a PGW-C may be used; any suitable SMF node configured to perform similar operations as an SMF may be used; any suitable SGW-U node configured to perform similar operations as an SGW-U may be used; any suitable PGW-C node configured to perform similar operations as a PGW-C may be used; and any suitable UPF node configured to perform similar operations as a UPF may be used.

In various embodiments, PDN 116 may be any combination of the Internet, a Fixed Wireless Access (FWA) network, an Ethernet network, an Ethernet switching system(s), and/or the like. PDN 116 may be configured to facilitate user plane (e.g., user data/data transfer) connectivity for UE 102. For example, UE 102 may be configured to access various services, applications, etc. from PDN 116. IMS core 118 may be configured to provide IP multimedia services for UE 102. PDN/IMS core 120 may be any combination of the Internet, an IMS core, an Ethernet network, an Ethernet switching system(s), and/or the like.

4G/5G network slice 110 may be configured to support Internet sessions, data sessions, Ultra Reliable Low-Latency Communication (URLLC) (e.g., gaming) sessions, SOS (emergency services) sessions, etc. In particular, 4G/5G network slice 110 may provide UE 102 with network connectivity to PDN 116. 4G/5G network slice 112 may be configured for IMS sessions. In particular, 4G/5G network slice 112 may provide UE 102 with network connectivity to IMS core 118. 4G network gateway core 114 may be configured for Internet sessions, data sessions, URLLC sessions, IMS sessions, etc. In particular, 4G network gateway core 114 may provide UE 102 with network connectivity to PDN/IMS core 120.

Oftentimes, a UE sends an initial connectivity request for a network connection between the UE and an IMS core. In this situation, an MME typically selects an SGW and PGW based on the PGW of the IMS core (many operators maintain separate PGWs for different services, such as IMS core, Internet, etc.). For example, the MME can select the SGW and PGW that is topologically closest to the IMS core (e.g., on a network slice configured to serve the IMS core). The MME does not take into consideration possible subsequent network connections (e.g., over different network slices).

This becomes an issue when the UE sends a subsequent connectivity request for a network connection between the UE and a PDN. The MME selects a new PGW for the PDN, but the SGW used for the network connection between the UE and an IMS core is still used. This is because an SGW is selected on a per-UE basis, whereas a PGW is selected on a per-connection basis. That is, once an SGW is selected, that same SGW is used with all PGWs that are selected for subsequent network connections. Using the SGW that is topologically close to the IMS core for the network connection between the UE and the PDN can lead to inefficiencies due to poor selection of user plane nodes, such as establishment of a split session between an SGW-U hosted on one node in the IMS core network slice and a PGW-U and/or UPF hosted on other nodes in the PDN network slice. This can also create issue with charging/billing because use cases (e.g., involving inbound roaming subscribers) often involve the SGW being located in the network slice for the PDN.

Accordingly, SGW selection logic 138 is provided on MME 124 in order to cause MME 124 to intelligently select co-located SGW-C, PGW-C, and SMF 126 and co-located SGW-U, PGW-U, and UPF 128 for the network connection between UE 102 and IMS core 118. When a subsequent network connection is established between UE 102 and PDN 116, co-located SGW-C, PGW-C, and SMF 126 and co-located SGW-U, PGW-U, and UPF 128 continue to be used. Co-located SGW-C, PGW-C, and SMF 126 includes the optimal SGW-C for the subsequent network connection between UE 102 and PDN 116. Similarly, co-located SGW-U, PGW-U, and UPF 128 includes the optimal SGW-U for the network connection between UE 102 and PDN 116. Those SGW-C and SGW-U functionalities are topologically closest to PDN 116.

Moreover, the UPF of co-located SGW-U, PGW-U, and UPF 128 is located at the edge proximate to PDN 116, and selecting a co-located UPF and SGW-U in co-located SGW-U, PGW-U, and UPF 128 reduces infrastructure cost. Initial selection of the SGW-C in co-located SGW-C, PGW-C, and SMF 126 ensures optimal user experience for the network connection between UE 102 and PDN 116, even though UE 102 sends a network connectivity request for the network connection between UE 102 and IMS core 118 before the network connectivity request for the network connection between UE 102 and PDN 116.

As shown at 140, MME 124 obtains a connectivity request for a network connection between UE 102 and IMS core 118. The connectivity request may include a UE capability indication (e.g., via a Dual Connectivity with NR (DCNR) bit) that UE 102 is both 4G- and 5G-capable. UE 102 may send the connectivity request to MME 124 via cellular AP 122. Cellular AP 122 may be identified based on a Tracking Area List (TAL) that includes a number of Tracking Area Codes (TACs), with at least one TAC corresponding to cellular AP 122.

At 142, MME 124 uses DNS server 106 to resolve the appropriate SGW for the network connection between UE 102 and IMS core 118. MME 124 may provide, to DNS server 106, a query for a plurality of identifiers of candidate SGWs (e.g., SGW-Cs and SGW-Us). MME 124 may obtain the plurality of identifiers from DNS server 106 in a DNS response. The plurality of identifiers may include SGW-Cs (and SGW-Us) of 4G/5G network slice 110, standalone SGW-C/U 108, and SGW-Cs 4G network gateway core 114. The plurality of identifiers may include an indication that the SGW-C of 4G/5G network slice 110 is co-located with the PGW-C of 4G/5G network slice 110 (i.e., as part of co-located SGW-C, PGW-C, and SMF 126). The plurality of identifiers may further include an indication that the SGW-U of 4G/5G network slice 110 is co-located with the PGW-U of 4G/5G network slice 110 (i.e., as part of co-located SGW-U, PGW-U, and UPF 128).

In this example, DNS server 106 may return the SGW-Cs and SGW-Us of 4G/5G network slice 110, standalone SGW-C/U 108, and 4G network gateway core 114. MME 124 may select the SGW-C and the SGW-U of 4G/5G network slice 110 even though another SGW-C and SGW-U (e.g., standalone SGW-C/U 108) may be more optimal for the network connection between UE 102 and IMS core 118. MME 124 selects the SGW-C and SGW-U of 4G/5G network slice 110 in anticipation of a subsequent network connection between UE 102 and PDN 116. More specifically, MME 124 is aware that the SGW-C of 4G/5G network slice 110 is co-located with the PGW-C of 4G/5G network slice 110 (i.e., as part of co-located SGW-C, PGW-C, and SMF 126), and that the SGW-U of 4G/5G network slice 110 is co-located with the PGW-U of 4G/5G network slice 110 (i.e., as part of co-located SGW-U, PGW-U, and UPF 128). The placement of that SGW-C, SGW-U, PGW-C, and PGW-U in 4G/5G network slice 110 will provide a more efficient experience for the subsequent network connection between UE 102 and PDN 116.

MME 124 may also use DNS server 106 to resolve the appropriate PGW for the network connection between UE 102 and IMS core 118. MME 124 may provide, to DNS server 106, a query for a plurality of identifiers of candidate PGWs (e.g., PGW-Cs and PGW-Us). MME 124 may obtain the plurality of identifiers from DNS server 106 in a DNS response. The plurality of identifiers may include PGW-Cs of 4G/5G network slice 110, 4G/5G network slice 112, and 4G network gateway core 114. The plurality of identifiers may include an indication that the PGW-C of 4G/5G network slice 110 is co-located with the SGW-C of 4G/5G network slice 110 (i.e., as part of co-located SGW-C, PGW-C, and SMF 126). The plurality of identifiers may further include an indication that the PGW-U of 4G/5G network slice 110 is co-located with the SGW-U of 4G/5G network slice 110 (i.e., as part of co-located SGW-U, PGW-U, and UPF 128).

In one example, if a topon Fully Qualified Domain Name (FQDN) matching feature is enabled, DNN (e.g., Access Point Name (APN)) and Tracking Area Identity (TAI) resolution operations may return SGW and PGW identities that have the same locality (such as the SGW-Cs, SGW-Us, PGW-Cs, and PGW-Us of 4G/5G network slice 110 and 4G/5G network slice 112). Topon selection may indicate that co-located/topologically close node selection is preferred, and may aim to find optimal SGW and PGW locations through a DNS look up of the APN(s) and TAI(s). One or more APNs may be used to identify candidate PGWs, and one or more TAIs may be used to identify candidate SGWs.

At 144, MME 124 may select the PGW-C (and the PGW-U) of 4G/5G network slice 112 from the PGW-Cs and PGW-Us of 4G/5G network slice 110, 4G/5G network slice 112, and 4G network gateway core 114. MME 124 may select the PGW-C and PGW-U of 4G/5G network slice 112 so as to enable the network connection between UE 102 and IMS core 118. Thus, when the network connection between UE 102 and IMS core 118 is established, the control plane may include the SGW-C in 4G/5G network slice 110 and the PGW-C in 4G/5G network slice 112. The user plane may include the SGW-U in 4G/5G network slice 110 and the PGW-U in 4G/5G network slice 112. The SGW-U in 4G/5G network slice 110 may communicate with the PGW-U in 4G/5G network slice 112 over the S5/S8-U interface.

At 146, MME 124 obtains a connectivity request for a network connection between UE 102 and PDN 116. In response to the connectivity request, MME 124 establishes the network connection with the SGW (e.g., SGW-C and SGW-U) in 4G/5G network slice 110 and the PGW (e.g., PGW-C and PGW-U) in 4G/5G network slice 110. The SGW therefore remains the same across both network connections, while the PGW has changed from the PGW in 4G/5G network slice 112 (in the network connection between UE 102 and IMS core 118) to the PGW in 4G/5G network slice 110 (in the network connection between UE 102 and PDN 116). This is because an SGW is used on a per-UE basis and may not change across network connections, whereas the PGW is used on a per-session/connection basis and may change across network connections. The control plane for the network connection between UE 102 and PDN 116 may include the SGW-C and the PGW-C in 4G/5G network slice 110 (i.e., in co-located SGW-C, PGW-C, and SMF 126). The user plane may include the SGW-U and the PGW-U in 4G/5G network slice 110 (i.e., in co-located SGW-U, PGW-U, and UPF 128).

To help facilitate optimized user plane selection and session establishment, the chosen SGW-C and PGW-C are co-located with an SMF (i.e., in co-located SGW-C, PGW-C, and SMF 126). Furthermore, co-located SGW-C, PGW-C, and SMF 126 is configured to communicate with co-located SGW-U, PGW-U, and UPF 128 via a concatenated Sxa/N4 interface. The concatenated Sxa/N4 interface may be a single interface that combines functionalities of both an Sxa interface and an N4 interface. Combining the SGW-C and SMF in co-located SGW-C, PGW-C, and SMF 126 allows for efficient and coordinated programming of the SGW-U and the UPF in co-located SGW-U, PGW-U, and UPF 128 over the concatenated Sxa/N4 interface.

Figure 2:
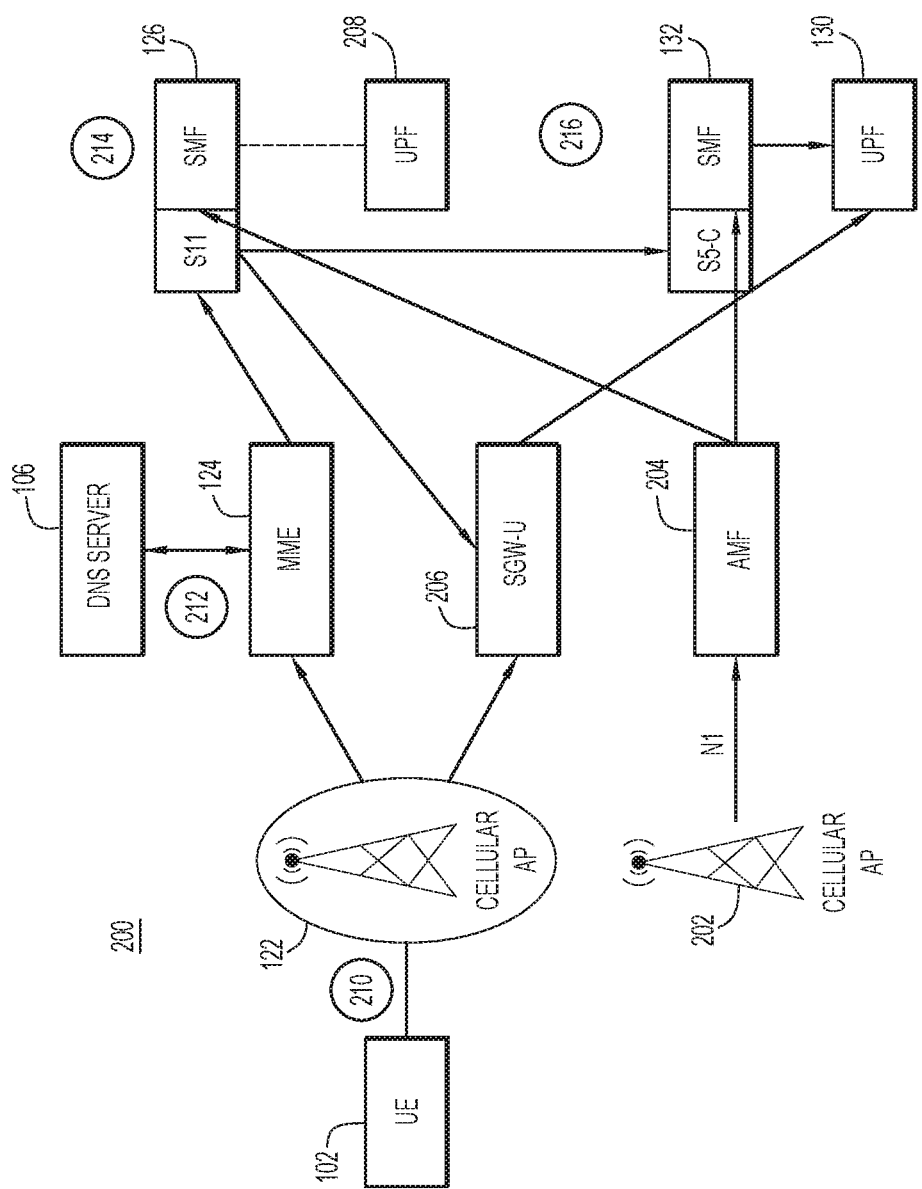
FIG. 2 illustrates a system configured to establish an initial network connection between a User Equipment (UE) and an Internet Protocol (IP) Multimedia Subsystem (IMS) core with an optimal SGW, according to an example embodiment.

With continued reference to FIG. 1, FIG. 2 illustrates an example system 200 configured to establish an initial network connection between UE 102 and IMS core 118 with an optimal SGW. System 200 includes cellular AP 122, MME 124, DNS server 106, co-located SGW-C, PGW-C, and SMF 126, co-located UPF and PGW-U 130, and co-located SMF and PGW-C 132. Co-located SGW-C, PGW-C, and SMF 126 is represented by an S11 interface and an SMF. Here, the S11 interface represents the SGW-C of co-located SGW-C, PGW-C, and SMF 126, and the SMF represents the co-located PGW-C and SMF of co-located SGW-C, PGW-C, and SMF 126. Co-located UPF and PGW-U 130 is represented by a UPF. Co-located SMF and PGW-C 132 is represented by a Control plane S5 (S5-C) interface and an SMF, where the S5-C interface represents the PGW-C of co-located SMF and PGW-C 132.

System 200 also includes cellular AP 202, Access and Mobility Management Function (AMF) 204, SGW-U 206, and UPF 208. Cellular AP 202 may terminate a cellular (e.g., 5G NR) air interface and may be configured with appropriate hardware (e.g., processor(s), memory element(s), antennas and/or antenna arrays, baseband processors (modems), and/or the like), software, logic, and/or the like to provide over-the-air coverage for cellular access. Cellular AP 202 may be implemented as a next-generation Node B (gNB) to facilitate 5G NR air access. AMF 204 is a 5G component and may be configured to handle mobility management and connection tasks based on information relating to network connections and sessions obtained from UE 102 over an N1 interface. SGW-U 206 may be the SGW-U in co-located SGW-U, PGW-U, and UPF 128, and UPF 208 may be the UPF in co-located SGW-U, PGW-U, and UPF 128. In one example, UPF 208 may be an Intermediate UPF (I-UPF). Cellular AP 202 may communicate with one or more UPFs (e.g., UPF 208, the UPF in co-located UPF and PGW-U 130, etc.) over one or more N3 interfaces.

At 210, MME 124 obtains, from UE 102, an initial 4G PDN connectivity attach request for IMS core 118. The attach request may identify one or more APNs (e.g., for both PDN 116 and IMS core 118). At 212, MME 124 may resolve each APN. DNS server 106 may search for an SGW-C co-location attribute referred to as a network capability indication, which may indicate that the SGW-C is co-located with one or more other network components (e.g., PGW-C and/or SMF), and return the SGW-C record of the SGW-C in co-located SGW-C, PGW-C, and SMF 126. At 214, MME 124 may select that SGW-C for the network connection with IMS core 118 so that a subsequent attach request for PDN 116 may continue to use the same SGW-C. If there are multiple responses for SGW-Cs with an SGW-C co-location attribute, the most optimal SGW-C (e.g., the topologically closest SGW-C to PDN 116) may be selected. MME 124 may use an Nnrf interface to select the SGW-C in co-located SGW-C, PGW-C, and SMF 126. At 216, MME 124 selects the PGW-C of co-located SMF and PGW-C 132 for the network connection with IMS core 118.

Figure 3:
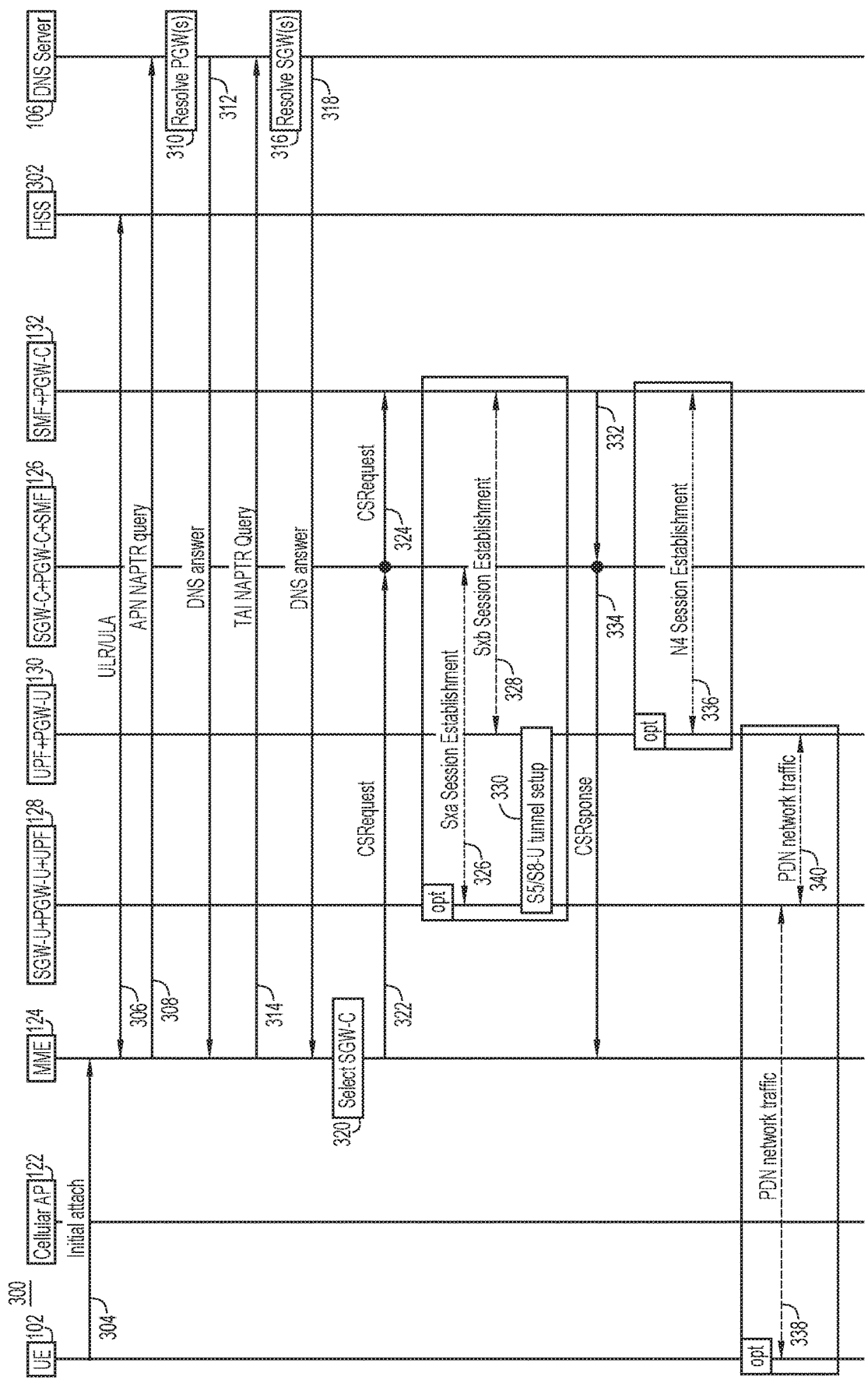
FIG. 3 illustrates a call flow diagram for establishing an initial network connection between a UE and an IMS core with an optimal SGW, according to an example embodiment.
Figure 4:
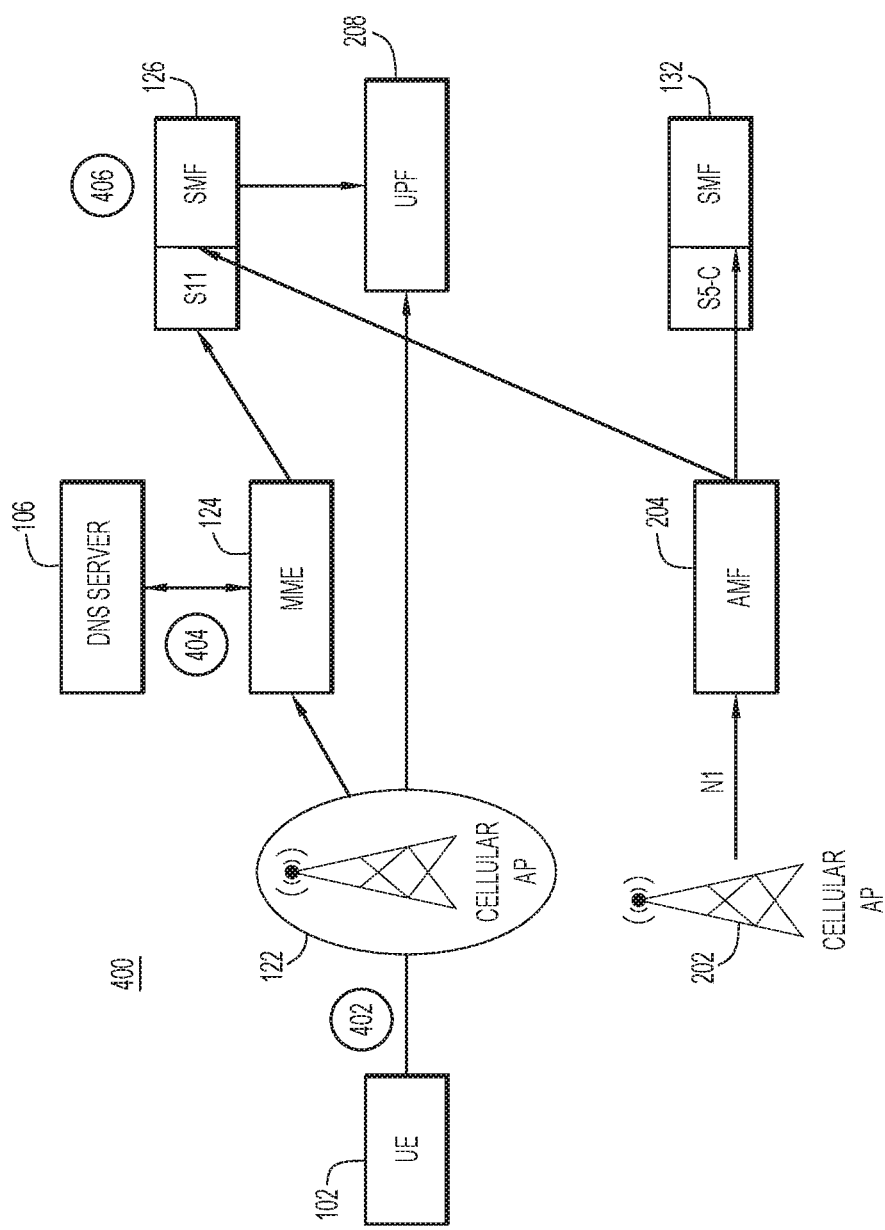
FIG. 4 illustrates a system configured to establish a subsequent Packet Data Network (PDN) session with an optimal SGW, according to an example embodiment.

With continued reference to FIG. 1, FIG. 3 illustrates an example call flow diagram 300 for establishing an initial network connection between UE 102 and IMS core 118 with an optimal SGW. Call flow diagram 300 illustrates operations between UE 102, cellular AP 122, MME 124, co-located SGW-U, PGW-U, and UPF 128, co-located UPF and PGW-U 130, co-located SGW-C, PGW-C, and SMF 126, co-located SMF and PGW-C 132, Home Subscriber Server (HSS) 302, and DNS server 106. An HSS is a 4G component, and may include a repository of subscriber information.

At 304, MME 124 obtains, from UE 102, an IMS PDN connectivity request as part of an initial attach request. At 306, MME 124 sends an Update Location Request (ULR) to HSS 302 and further obtains an Update Location Answer (ULA) from HSS 302. The ULA may include all APNs associated with the subscription of UE 102. The APNs may be intended for network connections to PDN 116 in addition to IMS core 118. Obtaining PGW addresses of all the relevant APNs, rather than just one, may permit MME 124 to choose the optimal SGW-C for the initial attach request. Querying all potential APNs/PDNs for UE 102 (from HSS 302) may enable MME 124 to make a location (e.g., TAI) and service (e.g., APNs/PDNs) based selection of an SGW (and co-located PGW/UPF) with full visibility.

The ULA may also include an indication or a hint to MME 124 to select an optimal SGW for UE 102. The hint may help MME 124 and/or DNS server 106 assist with optimal SGW selection, since MME 124 may not know a priori whether a given PDN request is to be established based on co-located SGW-C, PGW-C, and SMF 126. One example of a hint is a UE usage type. A UE usage type may indicate the usage characteristics of a UE that enables the selection of a specific core network, and may allow for a specific SGW, PGW, and even MME to be set for a given UE. This may assist MME 124 in selecting an appropriate co-located control plane node based on the UE usage type indicating an appropriate core network for the network connection.

In other examples, an indication or hint may be provided to an MME based on a local operator policy configuration, DCNR capability, an (e.g., appended) N1 Non-Access Stratum (NAS) capability, an International Mobile Subscriber Identity (IMSI) range, an attribute in the UE subscription in an Sha message, an S10 (N26) UE context, etc. Local operator policy configuration may be used, for example, if all the relevant APN names are managed locally on the MME. Alternatively, instead of using a hint, an IMS network slice may be constructed without an SGW-C so as to prompt selection of an SGW-C in a PDN network slice, provided that steps are taken to prevent selection of any other SGW-Cs (e.g., an SGW-C in a 4G-only network slice or in a standalone SGW-C/U).

Operations 308, 310, and 312 relate to PGW selection by MME 124. At 308, after obtaining all APNs associated with the subscription of UE 102, MME 124 may provide multiple APN NAPTR queries for every APN (e.g., including both the APN for PDN 116 and the APN for IMS core 118). At 310, DNS server 106 resolves the PGW(s) for all the subscribed/authorized APNs. At 312, MME 124 obtains an answer to the DNS NAPTR queries from DNS server 106. The answer may include a list of IP addresses for the PGWs resolved for the individual APNs (e.g., "x-3gpp-pgw:x-s5-gtp+nc-smf:x-s8-gtp+nc-smf"). The list may also include a network capability indication. For example, the list may include a network capability service parameter extension indicating that the PGW-Cs are co-located with respective SGW-Cs and/or SMFs (e.g., "x-3gpp-pgw:x-s5-gtp+nc-smf.combo:x-s8-gtp+nc-smf.combo").

Provided below are example APN FQDN DNS NAPTR resource records for PGW address resolution that may be included in the answer to the DNS query.

ims.apn.epc.mnc001.mcc001.3gppnetwork.org. IN NAPTR 10 100 "a" "x-3gpp-pgw:x-s5-gtp+nc-smf:x-s8-gtp+nc-smf" " "
topon.pgw.instance1.site1.epc.mnc001.mcc001.3gppnetwork.org.
ims.apn.epc.mnc001.mcc001.3gppnetwork.org. IN NAPTR 10 100 "a" "x-3gpp-pgw:x-s5-gtp+nc-smf:x-s8-gtp+nc-smf" " "
topon.pgw.instance2.site1.epc.mnc001.mcc001.3gppnetwork.org.
ims.apn.epc.mnc001.mcc001.3gppnetwork.org. IN NAPTR 10 100 "a" "x-3gpp-pgw:x-s5-gtp+nc-smf:x-s8-gtp+nc-smf" " "
topon.pgw.instance1.site2.epc.mnc001.mcc001.3gppnetwork.org.
ims.apn.epc.mnc001.mcc001.3gppnetwork.org. IN NAPTR 10 100 "a" "x-3gpp-pgw:x-s5-gtp+nc-smf:x-s8-gtp+nc-smf" " "
topon.pgw.instance2.site2.epc.mnc001.mcc001.3gppnetwork.org.
internet.apn.epc.mnc001.mcc001.3gppnetwork.org. IN NAPTR 10 100 "a" "x-3gpp-pgw:x-s5-gtp:x-s8-gtp:x-s2b-gtp" " "
topon.pgw.instance3.site1.epc.mnc001.mcc001.3gppnetwork.org.
internet.apn.epc.mnc001.mcc001.3gppnetwork.org. IN NAPTR 10 100 "a" "x-3gpp-pgw:x-s5-gtp:x-s8-gtp:x-s2b-gtp" " "
topon.pgw.instance3.site2.epc.mnc001.mcc001.3gppnetwork.org.
internet.apn.epc.mnc001.mcc001.3gppnetwork.org. IN NAPTR 10 100 "a" "x-3gpp-pgw:x-s5-gtp+nc-smf.combo:x-s8-gtp+nc-smf.combo" " "
topon.pgw.instance4.site1.epc.mnc001.mcc001.3gppnetwork.org.
internet.apn.epc.mnc001.mcc001.3gppnetwork.org. IN NAPTR 10 100 "a" "x-3gpp-pgw:x-s5-gtp+nc-smf.combo:x-s8-gtp+nc-smf.combo" " "
topon.pgw.instance4.site2.epc.mnc001.mcc001.3gppnetwork.org.
sos.apn.epc.mnc001.mcc001.3gppnetwork.org. IN NAPTR 10 100 "a" "x-3gpp-pgw:x-s5-gtp+nc-smf:x-s8-gtp+nc-smf" " "
topon.pgw.instance1.site1.epc.mnc001.mcc001.3gppnetwork.org.
sos.apn.epc.mnc001.mcc001.3gppnetwork.org. IN NAPTR 10 100 "a" "x-3gpp-pgw:x-s5-gtp+nc-smf:x-s8-gtp+nc-smf" " "
topon.pgw.instance2.site1.epc.mnc001.mcc001.3gppnetwork.org.
sos.apn.epc.mnc001.mcc001.3gppnetwork.org. IN NAPTR 10 100 "a" "x-3gpp-pgw:x-s5-gtp+nc-smf:x-s8-gtp+nc-smf" " "
topon.pgw.instance1.site2.epc.mnc001.mcc001.3gppnetwork.org.
sos.apn.epc.mnc001.mcc001.3gppnetwork.org. IN NAPTR 10 100 "a" "x-3gpp-pgw:x-s5-gtp+nc-smf:x-s8-gtp+nc-smf" " "
topon.pgw.instance2.site2.epc.mnc001.mcc001.3gppnetwork.org.
topon.pgw.instance1.site1.epc.mnc001.mcc001.3gppnetwork.org. IN AAAA 2001::1
topon.pgw.instance2.site1.epc.mnc001.mcc001.3gppnetwork.org. IN AAAA 2001::2
topon.pgw.instance1.site2.epc.mnc001.mcc001.3gppnetwork.org. IN AAAA 2001::3
topon.pgw.instance2.site2.epc.mnc001.mcc001.3gppnetwork.org. IN AAAA 2001::4
topon.pgw.instance3.site1.epc.mnc001.mcc001.3gppnetwork.org. IN AAAA 2001::5
topon.pgw.instance3.site2.epc.mnc001.mcc001.3gppnetwork.org. IN AAAA 2001::6
topon.pgw.instance4.site1.epc.mnc001.mcc001.3gppnetwork.org. IN AAAA 2001::7
topon.pgw.instance4.site2.epc.mnc001.mcc001.3gppnetwork.org. IN AAAA 2001::8

Operations 314, 316, and 318 relate to SGW selection by MME 124. At 314, MME 124 may provide a TAI NAPTR query for UE 102. The TAI NAPTR query may include a network capability indication of UE 102 (e.g., specifying that there is a preference for the SGW to be co-located with an SMF). At 316, DNS server 106 resolves the SGW(s) that serve the TAI based on the network capability indication. At 318, MME 124 obtains an answer to the TAI NAPTR query from DNS server 106. The answer may include a list of IP addresses for the SGWs resolved for the relevant TAI (e.g., "x-3gpp-sgw:x-s5-gtp:x-s8-gtp"). The list may also include a network capability service parameter extension indicating that the SGW-Cs are co-located with respective PGW-Cs and/or SMFs (e.g., "x-3gpp-sgw:x-s5-gtp+nc-smf.combo:x-s8-gtp+nc-smf.combo"). This may assist MME 124 in selecting an appropriate co-located control plane node. In particular, if MME 124 is aware that multiple PDNs are going to be established for multiple APNs, then MME 124 may search the authorized APN list in anticipation that there may be subsequent PDN connection requests.

Thus, the UE usage type and network capability indication may serve to provide an explicit indication that an SGW-C should be selected that is co-located with a PGW-C configured to support a network connection with PDN 116. The SGW-C may be specified for UE 102 through DNS NAPTR resolution of a TAI FQDN. For example, the UE usage type for UE 102 may be set to "5G Combo" and the network capability for UE 102 may be set to "smf" to ensure that DNS server 106 returns an SGW-C that is co-located with an SMF that serves PDN 116.

Provided below are example TAI FQDN DNS NAPTR resource records for SGW address resolution that may be included in the answer to the DNS query.

*.tac-hb00.tac.epc.mnc001.mcc001.3gppnetwork.org. IN NAPTR 10 100 "a" "x-3gpp-sgw:x-s5-gtp:x-s8-gtp" " " topon.sgw.instance1.site1.epc.mnc001.mcc001.3gppnetwork.org.
*.tac-hb00.tac.epc.mnc001.mcc001.3gppnetwork.org. IN NAPTR 10 100 "a" "x-3gpp-sgw:x-s5-gtp:x-s8-gtp" " " topon.sgw.instance2.site1.epc.mnc001.mcc001.3gppnetwork.org.
*.tac-hb00.tac.epc.mnc001.mcc001.3gppnetwork.org. IN NAPTR 20 100 "a" "x-3gpp-sgw:x-s5-gtp:x-s8-gtp" " " topon.sgw.instance1.site2.epc.mnc001.mcc001.3gppnetwork.org.
*.tac-hb00.tac.epc.mnc001.mcc001.3gppnetwork.org. IN NAPTR 20 100 "a" "x-3gpp-sgw:x-s5-gtp:x-s8-gtp" " " topon.sgw.instance2.site2.epc.mnc001.mcc001.3gppnetwork.org.
*.tac-hb00.tac.epc.mnc001.mcc001.3gppnetwork.org. IN NAPTR 10 100 "a" "x-3gpp-sgw:x-s5-gtp:x-s8-gtp" " " topon.sgw.instance3.site1.epc.mnc001.mcc001.3gppnetwork.org.
*.tac-hb00.tac.epc.mnc001.mcc001.3gppnetwork.org. IN NAPTR 20 100 "a" "x-3gpp-sgw:x-s5-gtp:x-s8-gtp" " " topon.sgw.instance3.site2.epc.mnc001.mcc001.3gppnetwork.org.
*.tac-hb00.tac.epc.mnc001.mcc001.3gppnetwork.org. IN NAPTR 10 100 "a" "x-3gpp-sgw:x-s5-gtp+nc-smf.combo:x-s8-gtp+nc-smf.combo" " " topon.sgw.instance4.site1.epc.mnc001.mcc001.3gppnetwork.org.
*.tac-hb00.tac.epc.mnc001.mcc001.3gppnetwork.org. IN NAPTR 20 100 "a" "x-3gpp-sgw:x-s5-gtp+nc-smf.combo:x-s8-gtp+nc-smf.combo" " " topon.sgw.instance4.site2.epc.mnc001.mcc001.3gppnetwork.org.
topon.sgw.instance1.site1.epc.mnc001.mcc001.3gppnetwork.org. IN AAAA2002::1
topon.sgw.instance2.site1.epc.mnc001.mcc001.3gppnetwork.org. IN AAAA2002::2
topon.sgw.instance1.site2.epc.mnc001.mcc001.3gppnetwork.org. IN AAAA2002::3
topon.sgw.instance2.site2.epc.mnc001.mcc001.3gppnetwork.org. IN AAAA2002::4
topon.sgw.instance3.site1.epc.mnc001.mcc001.3gppnetwork.org. IN AAAA2002::5
topon.sgw.instance3.site2.epc.mnc001.mcc001.3gppnetwork.org. IN AAAA2002::6
topon.sgw.instance4.site1.epc.mnc001.mcc001.3gppnetwork.org. IN AAAA2002::7
topon.sgw.instance4.site2.epc.mnc001.mcc001.3gppnetwork.org. IN AAAA2002::8

At 320, MME 124 identifies co-located SGW-C, PGW-C, and SMF 126 based on a reference to a local policy configuration, combination attribute(s), and/or network capability service parameter extension(s). For example, MME 124 may search the list of IP addresses for the appropriate SGW-C based on the network capability service parameter extension indicating that the SGW-C is co-located with the SGW-C and SMF (and/or based on the UE usage type specifying a particular core network). MME 124 may select the SGW-C in the co-located SGW-C, PGW-C, and SMF 126 in response (at least in part) to obtaining the UE usage type at 306. At 322, MME 124 may provide a Create Session (CS) request to co-located SGW-C, PGW-C, and SMF 126, and at 324, co-located SGW-C, PGW-C, and SMF 126 may provide the CS request to co-located SMF and PGW-C 132.

Operations 326, 328, and 330 relate to IMS data plane path setup for 4G access. At 326, an Sxa session is established between co-located SGW-U, PGW-U, and UPF 128 and co-located SGW-C, PGW-C, and SMF 126. At 328, an Sxb session is established between co-located UPF and PGW-U 130 and co-located SMF and PGW-C 132. At 330, an S5/S8-U tunnel is set up between co-located SGW-U, PGW-U, and UPF 128 and co-located UPF and PGW-U 130. At 332, co-located SMF and PGW-C 132 may provide a CS response to co-located SGW-C, PGW-C, and SMF 126, and at 334, co-located SGW-C, PGW-C, and SMF 126 may provide the CS response to MME 124.

At 336, an N4 session is established between co-located UPF and PGW-U 130 and co-located SMF and PGW-C 132. This permits IMS data plane path setup for 5G access. At 338, PDN network traffic is transmitted between UE 102 and co-located SGW-U, PGW-U, and UPF 128, and at 340, the PDN network traffic is transmitted between co-located SGW-U, PGW-U, and UPF 128 and co-located UPF and PGW-U 130 (e.g., to/from IMS core 118). Thus, an IMS PDN connection is established to IMS core 118.

With continued reference to FIGS. 1-3, FIG. 4 illustrates an example system 400 configured to establish a subsequent APN based 4G PDN session with an optimal SGW. The operations associated with system 400 may occur after the operations associated with system 200. Thus, MME 124 has already established a network connection between UE 102 and IMS core 118. This example involves a follow-up connection initiated by UE 102 shortly after the previous network session was successfully established. At 402, MME 124 obtains, from UE 102, a request for a network connection to a PDN. At 404, MME 124 obtains candidate PGW-Cs from DNS server 106. At 406, MME 124 selects the PGW-C of co-located SGW-C, PGW-C, and SMF 126 and establishes the connection with that PGW-C.

Figure 5:
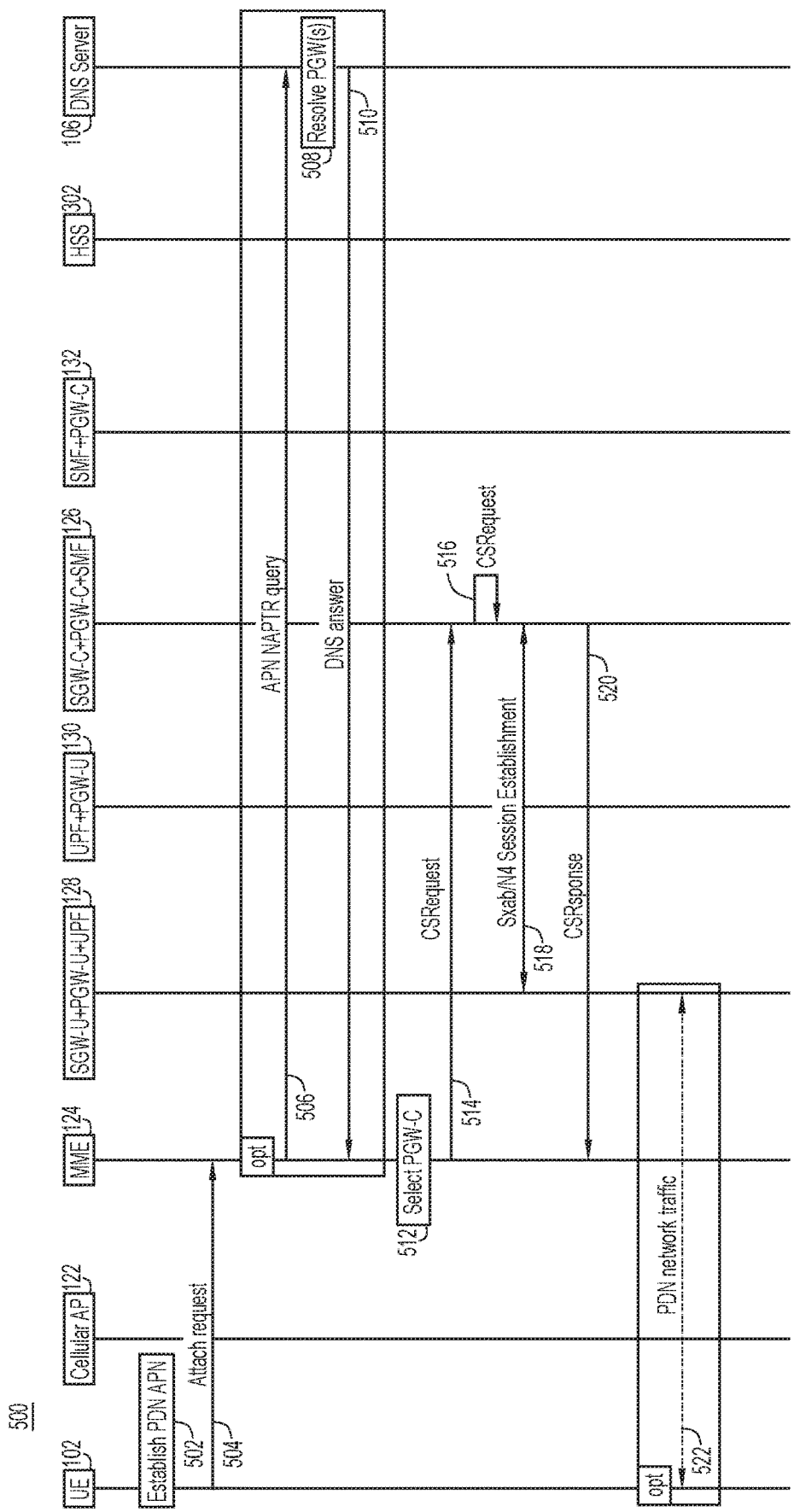
FIG. 5 illustrates a call flow diagram for establishing a subsequent PDN session with an optimal SGW, according to an example embodiment.

With continued reference to FIGS. 1 and 3, FIG. 5 illustrates an example call flow diagram 500 for establishing a subsequent PDN session with an optimal SGW. At 502, UE 102 establishes a PDN APN. At 504, MME 124 obtains an attach request (e.g., a PDN connectivity request) from UE 102. Operations 506, 508, and 510 relate to PGW selection. At 506, MME 124 provides an APN NAPTR query to DNS server 106. At 508, DNS server 106 resolves the PGW(s) of the APN(s) for the PDN(s). At 510, MME 124 obtains an answer to the DNS NAPTR queries from DNS server 106. The answer may include one or more IP addresses for the PGW(s) resolved for the APN(s). The answer may also include a network capability service parameter extension indicating that the PGW-C(s) are co-located with SGW-C(s) and SMF(s) (e.g., "x-3 gpp-pgw:x-s5-gtp+nc-smf.combo:x-s8-gtp+nc-smf.combo").

Operations 506, 508, and 510 may not be necessary if a Time-To-Live (TTL) associated with the previous DNS answer (FIG. 3, operation 312) has not expired. In that case, MME 124 may select the PGW-C based on the previous DNS answer. If the TTL has expired, the previous DNS answer was flushed out from the local DNS client cache of MME 124, and operations 506, 508, and 510 may be performed. In any event, at 512, MME 124 selects the PGW-C of co-located SGW-C, PGW-C, and SMF 126. MME 124 may select the PGW-C closest to the SGW-C of co-located SGW-C, PGW-C, and SMF 126. Here, the PGW-C of co-located SGW-C, PGW-C, and SMF 126 is selected for the PDN session, and the SGW-C of co-located SGW-C, PGW-C, and SMF 126 continues to be used for the PDN session.

At 514, MME 124 may provide a CS request to co-located SGW-C, PGW-C, and SMF 126. At 516, co-located SGW-C, PGW-C, and SMF 126 processes the CS request. At 518, an Sxab/N4 session is established between co-located SGW-C, PGW-C, and SMF 126 and co-located SGW-U, PGW-U, and UPF 128. At 520, MME 124 obtains a CS response from co-located SGW-C, PGW-C, and SMF 126. At 522, PDN network traffic travels between UE 102 and co-located SGW-U, PGW-U, and UPF 128, and at 342, the PDN network traffic is transmitted between co-located SGW-U, PGW-U, and UPF 128 and co-located UPF and PGW-U 130 (e.g., to/from PDN 116). Thus, a PDN connection is established to PDN 116 with co-located SGW-C, PGW-C, and SMF 126.

Figure 6:
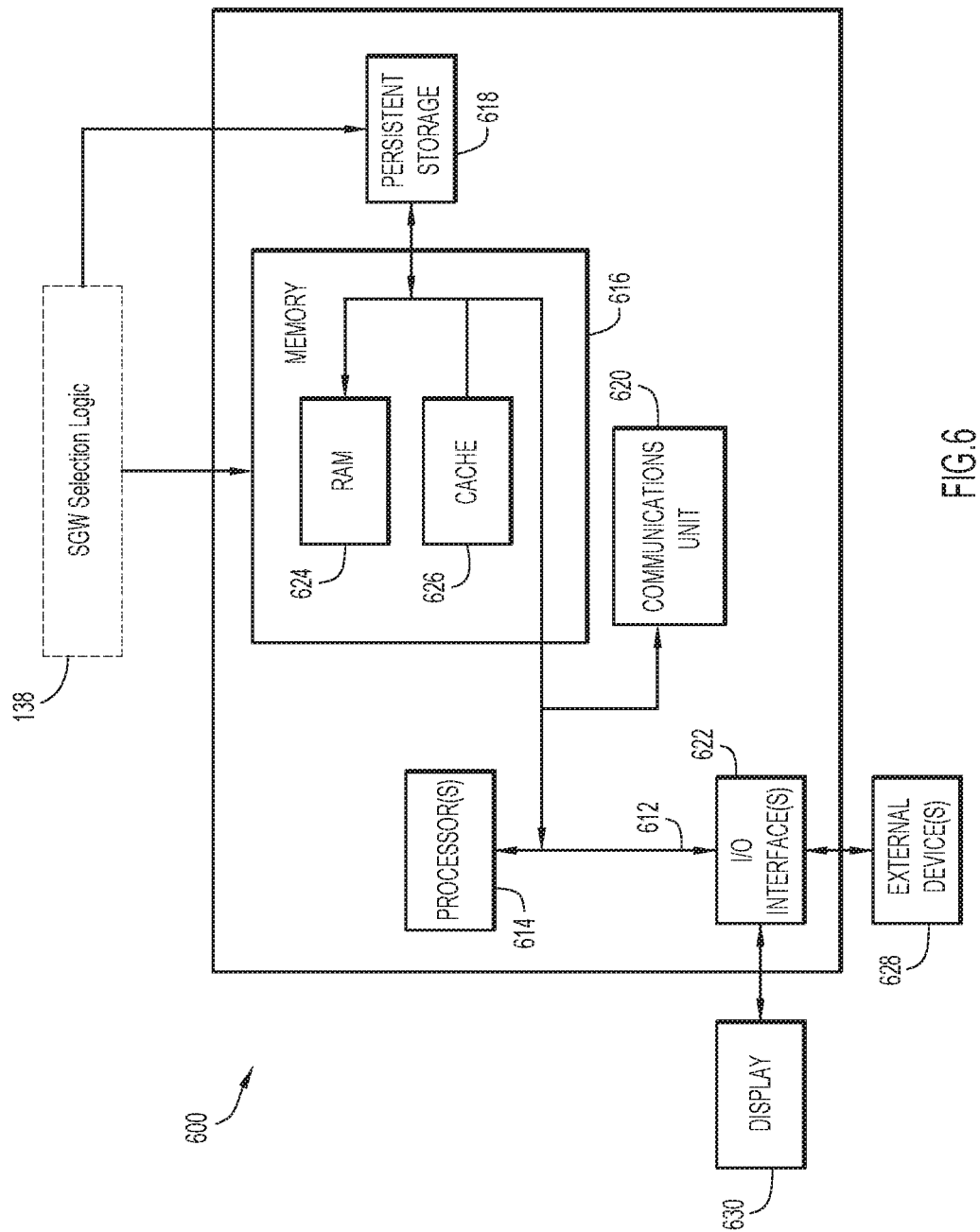
FIG. 6 illustrates a block diagram of a computing device configured to optimize SGW node selection for interworking networks, according to an example embodiment.

With continued reference to FIG. 1, FIG. 6 illustrates a hardware block diagram of an example device 600 (e.g., a computing device that hosts MME 124). It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and Input/Output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes Random Access Memory (RAM) 624 and cache memory 626. In general, memory 616 can include any suitable volatile or non-volatile computer readable storage media. Instructions for SGW selection logic 138 may be stored in memory 616 or persistent storage 618 for execution by computer processor(s) 614.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to device 600. For example, I/O interface(s) 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

Figure 7:
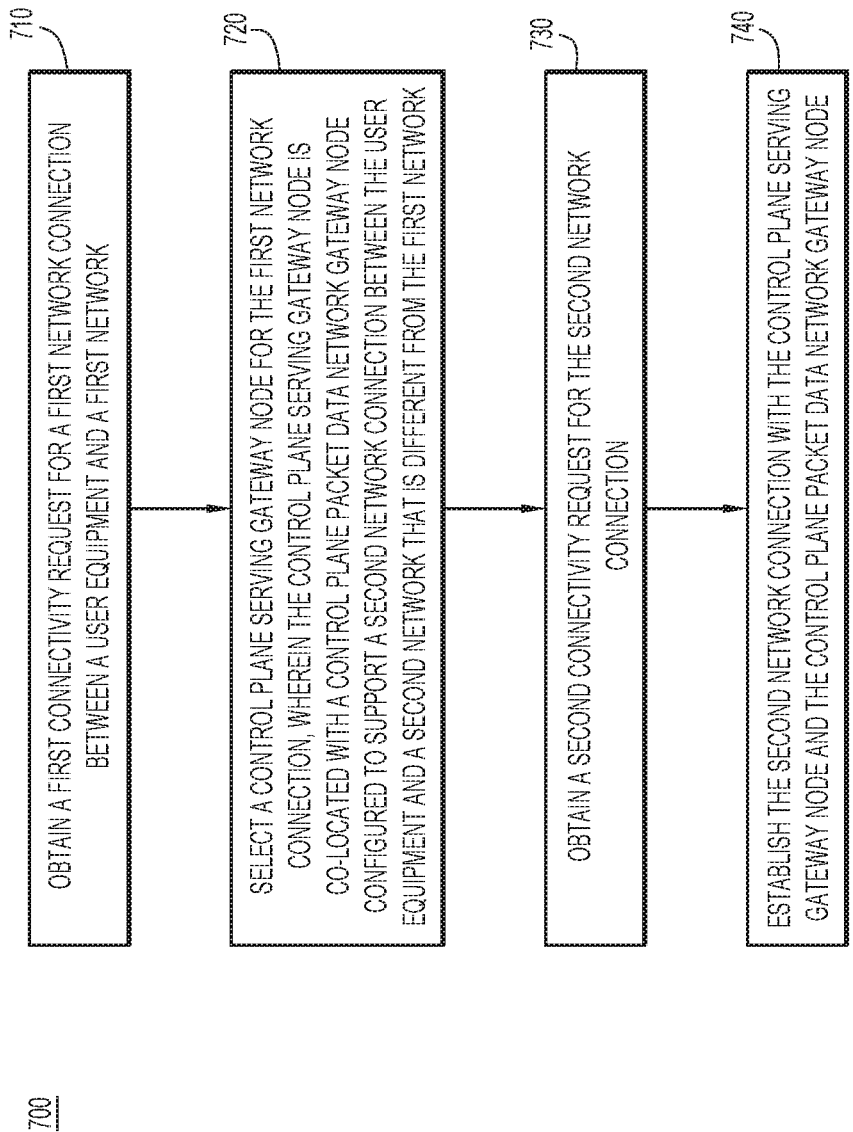
FIG. 7 illustrates a flowchart of a method for optimizing SGW node selection for interworking networks, according to an example embodiment.

With continued reference to FIG. 1, FIG. 7 is a flowchart of an example method 700 for optimizing SGW selection for interworking networks. In this example, MME 124 performs method 700. At 710, MME 124 obtains a first connectivity request for a first network connection between a UE and a first network. At 720, MME 124 selects an SGW-C node for the first network connection. The SGW-C node is co-located with a PGW-C node configured to support a second network connection between the UE and a second network that is different from the first network. At 730, MME 124 obtains a second connectivity request for the second network connection. At 740, MME 124 establishes the second network connection with the SGW-C node and the PGW-C node.

Techniques described herein may support Regional Data Center (RDC), Mobile Edge Computing (MEC), and/or I-UPF selection use cases in interworking networks deployments. Selecting a co-located SGW-C, PGW-C, and SMF node as discussed herein may be useful for matching expectations for 4G/5G capable subscribers in an RDC/MEC use case. In this use case, Internet/data APN based user plane instances (e.g., SGW-U, PGW-U, and UPF) may be combined together and hosted in an RDC. In particular, a combined, efficient, and optimized user plane node may be selected for a 4G/5G capable subscribers. Simplified and optimized user plane node selection for an Internet/data APN based PDN session may be achieved to efficiently support RDC/MEC and I-UPF use cases. The control plane may consistently select the combined user plane node for Internet APN calls for improved efficiency. The techniques described herein may avoid split sessions for SGW, PGW and SMF, thereby ensuring user/data plane efficiency in 4G/5G interworking mobility networks.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: obtaining a first connectivity request for a first network connection between a user equipment and a first network; selecting a control plane serving gateway node for the first network connection, wherein the control plane serving gateway node is co-located with a control plane packet data network gateway node configured to support a second network connection between the user equipment and a second network that is different from the first network; obtaining a second connectivity request for the second network connection; and establishing the second network connection with the control plane serving gateway node and the control plane packet data network gateway node.

In one example, the control plane serving gateway node and the control plane packet data network gateway node are co-located with a session management function node.

In one example, one or more of the control plane serving gateway node, the control plane packet data network gateway node, or the session management function node are configured to communicate with a co-located user plane serving gateway node, user plane packet data network gateway node, and user plane function node via a concatenated Sxa and N4 interface.

In one example, the method further comprises: providing a query for a plurality of identifiers of candidate control plane serving gateway nodes; and obtaining the plurality of identifiers including an identifier of the control plane serving gateway node and an indication that the control plane serving gateway node is co-located with the control plane packet data network gateway node, and wherein selecting the control plane serving gateway node includes selecting the control plane serving gateway node from the candidate control plane serving gateway nodes based on the indication.

In one example, the method further comprises: selecting one of a plurality of candidate control plane packet data network gateway nodes for the first network connection; in response to obtaining the second connectivity request, determining that a time to live associated with the plurality of candidate control plane packet data network gateway nodes has not expired; and in response to determining that the time to live has not expired, selecting the control plane packet data network gateway node from the plurality of candidate control plane packet data network gateway nodes.

In one example, the method further comprises: obtaining a user equipment usage type information element indicating that a particular control plane serving gateway node should be selected that is co-located with a particular control plane packet data network gateway node configured to support the second network connection, wherein selecting the control plane serving gateway node includes selecting the control plane serving gateway node in response to obtaining the user equipment usage type information element.

In one example, the first network is an internet protocol multimedia subsystem core network, and the second network is a packet data network.

In another form, an apparatus is provided. The apparatus comprises: a network interface configured to obtain or provide network communications; and one or more processors coupled to the network interface, wherein the one or more processors are configured to: obtain a first connectivity request for a first network connection between a user equipment and a first network; select a control plane serving gateway node for the first network connection, wherein the control plane serving gateway node is co-located with a control plane packet data network gateway node configured to support a second network connection between the user equipment and a second network that is different from the first network; obtain a second connectivity request for the second network connection; and establish the second network connection with the control plane serving gateway node and the control plane packet data network gateway node.

In another form, one or more non-transitory computer readable storage media are provided. The non-transitory computer readable storage media are encoded with instructions that, when executed by a processor, cause the processor to: obtain a first connectivity request for a first network connection between a user equipment and a first network; select a control plane serving gateway node for the first network connection, wherein the control plane serving gateway node is co-located with a control plane packet data network gateway node configured to support a second network connection between the user equipment and a second network that is different from the first network; obtain a second connectivity request for the second network connection; and establish the second network connection with the control plane serving gateway node and the control plane packet data network gateway node.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
obtaining a first connectivity request for a first network connection between a user equipment and a first network comprising an Internet Protocol (IP) Multimedia Subsystem (IMS) core;
providing a Domain Name System (DNS) query for a plurality of identifiers of a plurality of candidate control plane serving gateway nodes that serve a particular tracking area identifier (TAI);
obtaining the plurality of identifiers for each of the plurality of candidate control plane serving gateway nodes that serves the particular TAI and, for each of the plurality of candidate control plane serving gateway nodes, a network capability indication indicating whether each of the plurality of candidate control plane serving gateway nodes are co-located with a control plane packet data network gateway node;
selecting a first control plane serving gateway node from among the plurality of candidate control plane serving gateway nodes based, at least in part, on a particular network capability indication for the first control plane serving gateway node indicating that the first control plane serving gateway node is co-located with a first control plane packet data network gateway node, wherein the first control plane packet data network gateway node is configured to support network connectivity with a second network comprising a Packet Data Network (PDN) and wherein the first control plane serving gateway node interfaces with a second control plane packet data network gateway node that is different from the first control plane packet data network gateway node and that is configured to support network connectivity with the IMS core;
establishing the first network connection with the first control plane serving gateway node and the second control plane packet data network gateway node for the IMS core;
obtaining a second connectivity request for a second network connection between the user equipment and the second network comprising the PDN; and
establishing the second network connection with the first control plane serving gateway node and the first control plane packet data network gateway node.

2. The method of claim 1, wherein the first control plane serving gateway node and the first control plane packet data network gateway node are co-located with a session management function node.

3. The method of claim 2, wherein one or more of the first control plane serving gateway node, the first control plane packet data network gateway node, or the session management function node are configured to communicate with a co-located user plane serving gateway node, a user plane packet data network gateway node, and a user plane function node via a concatenated Sxa and N4 interface.

4. The method of claim 1, further comprising:
selecting one of a plurality of candidate control plane packet data network gateway nodes as the first control plane packet data network gateway node for the first network connection, wherein:
determining that a time to live associated with the plurality of candidate control plane packet data network gateway nodes has not expired; and
in response to determining that the time to live has not expired, establishing the second network connection between the user equipment and the second network comprising the PDN.

5. The method of claim 1, further comprising:
obtaining a user equipment usage type information element indicating that a particular control plane serving gateway node should be selected that is co-located with a particular control plane packet data network gateway node configured to support the second network connection between the user equipment and the second network comprising the PDN, wherein selecting the first control plane serving gateway node includes selecting the first control plane serving gateway node based further on obtaining the user equipment usage type information element.

6. An apparatus comprising:
a network interface configured to obtain or provide network communications; and
one or more processors coupled to the network interface, wherein the one or more processors are configured to:
  obtain a first connectivity request for a first network connection between a user equipment and a first network comprising an Internet Protocol (IP) Multimedia Subsystem (IMS) core;
  provide a Domain Name System (DNS) query for a plurality of identifiers of a plurality of candidate control plane serving gateway nodes that serve a particular tracking area identifier (TAI);
  obtain the plurality of identifiers for each of the plurality of candidate control plane serving gateway nodes that serves the particular TAI and, for each of the plurality of candidate control plane serving gateway nodes, a network capability indication indicating whether each of the plurality of candidate control plane serving gateway nodes are co-located with a control plane packet data network gateway node;
  select a first control plane serving gateway from among the plurality of candidate control plane serving gateway nodes based, at least in part, on a particular network capability indication for the first control plane serving gateway node indicating that the first control plane serving gateway node is co-located with a first control plane packet data network gateway node, wherein the first control plane packet data network gateway node is configured to support network connectivity with a second network comprising a Packet Data Network (PDN) and wherein the first control plane serving gateway node interfaces with a second control plane packet data network gateway node that is different from the first control plane packet data network gateway node and that is configured to support network connectivity with the IMS core;
  establish the first network connection with the first control plane serving gateway node and the second control plane packet data network gateway node for the IMS core;
  obtain a second connectivity request for a second network connection between the user equipment and the second network comprising the PDN; and
  establish the second network connection with the first control plane serving gateway node and the first control plane packet data network gateway node.

7. The apparatus of claim 6, wherein the first control plane serving gateway node and the first control plane packet data network gateway node are co-located with a session management function node.

8. The apparatus of claim 7, wherein one or more of the first control plane serving gateway node, the first control plane packet data network gateway node, or the session management function node are configured to communicate with a co-located user plane serving gateway node, a user plane packet data network gateway node, and a user plane function node via a concatenated Sxa and N4 interface.

9. The apparatus of claim 6, wherein the one or more processors are further configured to:
  select one of a plurality of candidate control plane packet data network gateway nodes as the first control plane packet data network gateway node for the first network connection;
  in response to obtaining the second connectivity request, determine that a time to live associated with the plurality of candidate control plane packet data network gateway nodes has not expired; and
  in response to determining that the time to live has not expired, establish the second network connection.

10. The apparatus of claim 6, wherein the one or more processors are further configured to:
  obtain a user equipment usage type information element indicating that a particular control plane serving gateway node should be selected that is co-located with a particular control plane packet data network gateway node configured to support the second network connection between the user equipment and the second network comprising the PDN; and
  select the first control plane serving gateway node based further on obtaining the user equipment usage type information element.

11. One or more non-transitory computer readable storage media encoded with instructions that, when executed by a processor, cause the processor to:
  obtain a first connectivity request for a first network connection between a user equipment and a first network comprising an Internet Protocol (IP) Multimedia Subsystem (IMS) core;
  provide a Domain Name System (DNS) query for a plurality of identifiers of a plurality of candidate control plane serving gateway nodes that serve a particular tracking area identifier (TAI);
  obtain the plurality of identifiers for each of the plurality of candidate control plane serving gateway nodes that serves the particular TAI and, for each of the plurality of candidate control plane serving gateway nodes, a network capability indication indicating whether each of the plurality of candidate control plane serving gateway nodes are co-located with a control plane packet data network gateway node;
  select a first control plane serving gateway node from among the plurality of candidate control plane serving gateway nodes based, at least in part, on a particular network capability indication for the first control plane serving gateway node indicating that the first control plane serving gateway node is co-located with a first control plane packet data network gateway node, wherein the first control plane packet data network gateway node is configured to support network connectivity with a second network comprising a Packet Data Network (PDN) and wherein the first control plane serving gateway node interfaces with a second control plane packet data network gateway node that is different from the first control plane packet data network gateway node and that is configured to support network connectivity with the IMS core;
  establish the first network connection with the first control plane serving gateway node and the second control plane packet data network gateway node;
  obtain a second connectivity request for a second network connection between the user equipment and the second network comprising the PDN; and
  establish the second network connection with the first control plane serving gateway node and the first control plane packet data network gateway node.

12. The one or more non-transitory computer readable storage media of claim 11, wherein the first control plane serving gateway node and the first control plane packet data network gateway node are co-located with a session management function node.

13. The one or more non-transitory computer readable storage media of claim 12, wherein one or more of the first control plane serving gateway node, the first control plane packet data network gateway node, or the session management function node are configured to communicate with a co-located user plane serving gateway node, a user plane packet data network gateway node, and a user plane function node via a concatenated Sxa and N4 interface.

14. The one or more non-transitory computer readable storage media of claim 11, wherein the instructions further cause the processor to:
   select one of a plurality of candidate control plane packet data network gateway nodes as the first control plane packet data network gateway node for the first network connection;
   in response to obtaining the second connectivity request, determine that a time to live associated with the plurality of candidate control plane packet data network gateway nodes has not expired; and
   in response to determining that the time to live has not expired, establish the second network connection between the user equipment and the second network comprising the PDN.

15. The one or more non-transitory computer readable storage media of claim 11, wherein the instructions further cause the processor to:
   obtain a user equipment usage type information element indicating that a particular control plane serving gateway node should be selected that is co-located with a particular control plane packet data network gateway node configured to support the second network connection between the user equipment and the second network comprising the PDN; and
   select the first control plane serving gateway node based further on obtaining the user equipment usage type information element.

16. The method of claim 1, wherein the first connectivity request and the second connectivity request comprise requests for 5G network communications.

17. The apparatus of claim 6, wherein the first connectivity request and the second connectivity request comprise requests for 5G network communications.

18. The method of claim 1, wherein the first connectivity request is obtained from the user equipment and includes a user equipment (UE) capability indication for the user equipment indicating that the user equipment is capable of both 4G and 5G network communications.

19. The method of claim 18, further comprising:
   obtaining usage type information for the user equipment indicating a preference of the user equipment that a particular control plane serving gateway node should be selected that is co-located with a particular control plane packet data network gateway node configured to support the second network connection between the user equipment and the second network comprising the PDN, wherein selecting the first control plane serving gateway node is based additionally on both of the UE capability indication for the user equipment and the usage type information for the user equipment.

20. The apparatus of claim 6, wherein the first connectivity request is obtained from the user equipment and includes a user equipment (UE) capability indication for the user equipment indicating that the user equipment is capable of both 4G and 5G network communications.

* * * * *